(12) United States Patent
Lee et al.

(10) Patent No.: US 10,066,869 B2
(45) Date of Patent: Sep. 4, 2018

(54) REFRIGERATOR

(71) Applicant: LG ELECTRONICS INC., Seoul (KR)

(72) Inventors: Jihyun Lee, Seoul (KR); Woonkyu Seo, Seoul (KR); Daesung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/838,571

(22) Filed: Dec. 12, 2017

(65) Prior Publication Data
US 2018/0100691 A1 Apr. 12, 2018

Related U.S. Application Data

(63) Continuation of application No. 15/496,260, filed on Apr. 25, 2017, now Pat. No. 9,869,509, which is a
(Continued)

(30) Foreign Application Priority Data

Apr. 8, 2013 (KR) ........................ 10-2013-0038227

(51) Int. Cl.
*A47B 96/04* (2006.01)
*F25D 29/00* (2006.01)
(Continued)

(52) U.S. Cl.
CPC ......... *F25D 29/005* (2013.01); *F25D 23/028* (2013.01); *F25D 23/062* (2013.01);
(Continued)

(58) Field of Classification Search
CPC ............................ F25D 23/025; F25D 23/062
(Continued)

(56) References Cited

U.S. PATENT DOCUMENTS 7,836,709 B2 11/2010 An et al.
2006/0096303 A1 5/2006 Kavounas
(Continued)

FOREIGN PATENT DOCUMENTS

JP 2002-267337 9/2002
JP 2004-183987 7/2004

OTHER PUBLICATIONS

European Search Report dated Jul. 22, 2014 issued in Application No. 14 153 950.2.
(Continued)

*Primary Examiner* — Matthew W Ing
(74) *Attorney, Agent, or Firm* — KED & Associates LLP

(57) ABSTRACT

Disclosed is a refrigerator. The refrigerator includes a main body having a first storage compartment and a second storage compartment, in which food is stored, a first door configured to open the first storage compartment via pivotal rotation thereof, a second door configured to be moved forward of the second storage compartment to open the second storage compartment, a receptacle configured to be moved along with the second door and received in the second storage compartment, the receptacle serving to store food therein, and a camera installed to the main body to take a picture of the receptacle. The refrigerator further includes a control unit configured to combine a plurality of pictures taken by the camera as the second door is moved and configured to correct the images into an image showing the receptacle.

18 Claims, 18 Drawing Sheets

Related U.S. Application Data continuation of application No. 14/978,661, filed on Dec. 22, 2015, now Pat. No. 9,661,279, which is a continuation of application No. 14/191,940, filed on Feb. 27, 2014, now Pat. No. 9,255,730.

(51) Int. Cl.

| | |
|---|---|
| *G06T 7/38* | (2017.01) |
| *F25D 23/12* | (2006.01) |
| *H04N 5/232* | (2006.01) |
| *F25D 23/06* | (2006.01) |
| *F25D 25/02* | (2006.01) |
| *H04N 5/445* | (2011.01) |
| *H04N 7/18* | (2006.01) |
| *F25D 23/02* | (2006.01) |

(52) U.S. Cl.
CPC .......... *F25D 23/12* (2013.01); *F25D 25/025* (2013.01); *F25D 29/00* (2013.01); *G06T 7/38* (2017.01); *H04N 5/23293* (2013.01); *H04N 5/44504* (2013.01); *H04N 7/181* (2013.01); *F25D 2400/36* (2013.01); *F25D 2400/361* (2013.01); *F25D 2500/06* (2013.01); *F25D 2700/06* (2013.01); *F25D 2700/08* (2013.01); *G06T 2200/32* (2013.01)

(58) Field of Classification Search
USPC .................................. 312/401, 402, 404, 405
See application file for complete search history.

(56) References Cited

U.S. PATENT DOCUMENTS

| | | |
|---|---|---|
| 2008/0315739 A1 | 12/2008 | Hirano |
| 2010/0170289 A1 | 7/2010 | Graziano |
| 2010/0283573 A1 | 11/2010 | Yum et al. |
| 2013/0015753 A1 | 1/2013 | Son et al. |
| 2014/0137587 A1 | 5/2014 | Hitzelberger |

OTHER PUBLICATIONS

U.S. Office Action dated Jun. 4, 2015 issued in U.S. Appl. No. 14/191,940.

U.S. Notice of Allowance dated Sep. 25, 2015 issued in U.S. Appl. No. 14/191,940.

U.S. Office Action dated Feb. 4, 2016 issued in U.S. Appl. No. 14/978,661.

U.S. Final Office Action dated Jul. 7, 2016 issued in U.S. Appl. No. 14/978,661.

U.S. Office Action dated Oct. 21, 2016 issued in U.S. Appl. No. 14/978,661.

U.S. Notice of Allowance dated Jan. 17, 2017 issued in U.S. Appl. No. 14/978,661.

U.S. Office Action dated May 10, 2017 issued in co-pending U.S. Appl. No. 15/496,260.

U.S. Notice of Allowance dated Sep. 6, 2017 issued in co-pending U.S. Appl. No. 15/496,260.

FIG. 14
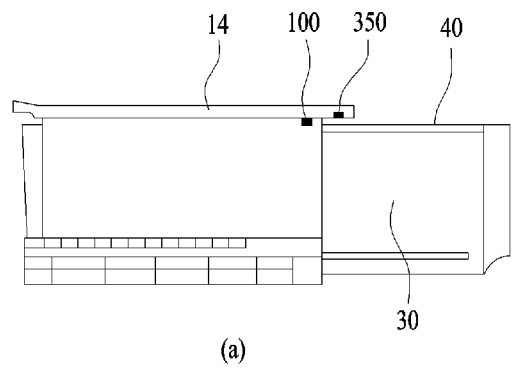
(a)
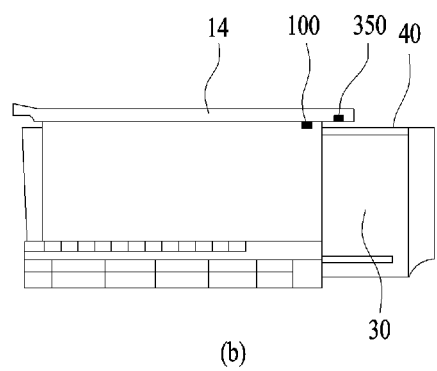
(b)
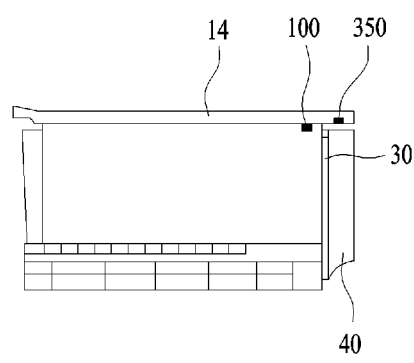
(c)

FIG. 18
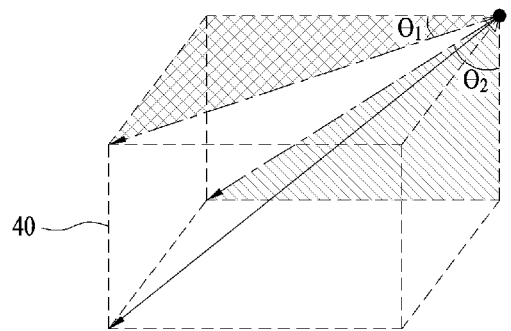
FIG. 19
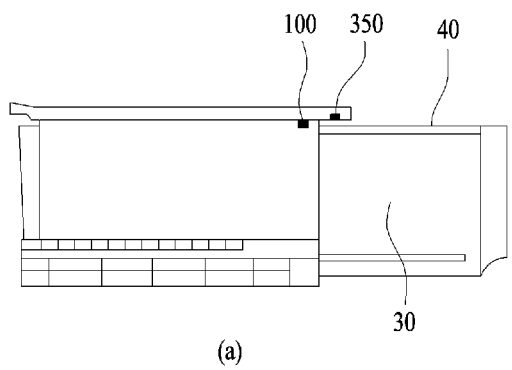
(a)
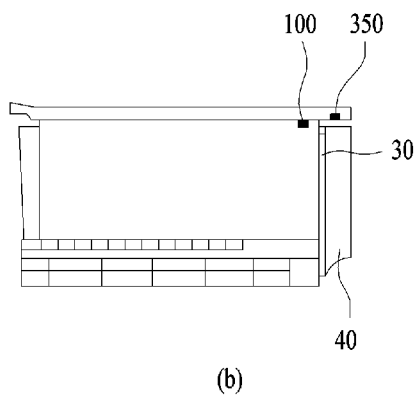
(b)

REFRIGERATOR

CROSS-REFERENCE TO RELATED APPLICATIONS

This application is a Continuation Application of prior U.S. patent application Ser. No. 15/496,260, filed on Apr. 25, 2017, which is a Continuation Application of prior U.S. patent application Ser. No. 14/978,661 filed on Dec. 22, 2015, now U.S. Pat. No. 9,661,279 issued on May 23, 2017, which is a Continuation Application of prior U.S. patent application Ser. No. 14/191,940 filed on Feb. 27, 2014, now U.S. Pat. No. 9,255,730 issued on Feb. 9, 2016, which claims priority under 35 U.S.C. § 119 to Korean Application No. 10-2013-0038227, filed on Apr. 8, 2013, whose entire disclosures are hereby incorporated by reference.

BACKGROUND OF THE INVENTION

Field of the Invention

The present invention relates to a refrigerator, and more particularly to a refrigerator which may provide a user with information related to food stored in the refrigerator.

Discussion of the Related Art

In general, a refrigerator is an apparatus that supplies cold air generated via driving of a refrigeration cycle and serves to store food in a low temperature state.

Conventional refrigerators may implement only a simple function of storing food in a low temperature state. However, in recent years, a need for additional functions except for a food storage function is increasing.

A refrigerator is configured to receive and store certain items and requires a user to open a refrigerator door in order to check the interior of the refrigerator. Moreover, if the user does not know the quantities and kinds of food stored in a refrigerator when trying to buy food, this may cause inconvenience because the user may buy food already stored in the refrigerator or fail to buy necessary food.

Therefore, various research is currently being conducted to solve the above-described user inconvenience.

SUMMARY OF THE INVENTION

Accordingly, the present invention is directed to a refrigerator that substantially obviates one or more problems due to limitation and disadvantages of the related art.

One object of the present invention is to provide a refrigerator which may provide a user with information related to food stored in the refrigerator.

Another object of the present invention is to provide a refrigerator which may allow a user to intuitively and easily recognize food stored in the refrigerator.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present invention, as embodied and broadly described herein, a refrigerator includes a main body having a storage compartment in which food is stored, a door configured to be moved forward of the storage compartment to open the storage compartment, a receptacle configured to be moved along with the door and received in the storage compartment, the receptacle serving to store food therein, a camera installed to the main body to capture an image of the receptacle, a control unit configured to combine an image captured by the camera in a closed state of the door and an image captured by the camera in an open state of the door with each other and configured to correct the images into an image showing the receptacle, and a display unit configured to show the corrected image to a user.

The open state of the door may include a state in which the door is open and is stationary.

The open state of the door may include a state in which the door is open and is moving.

The camera may be located in a front region of the storage compartment.

The camera may be installed to capture an image of the receptacle within a maximum withdrawal region of the receptacle.

The corrected image may show the receptacle looked down from the upper side.

The refrigerator may further include a receptacle position sensing unit configured to sense a position of the receptacle, and the camera may take a picture when a specific portion of the receptacle passes a predetermined position.

The refrigerator may further include a receptacle movement direction sensing unit configured to sense a movement direction of the receptacle, and the camera may take a picture when the receptacle is moved to be introduced into the storage compartment.

The refrigerator may further include a door opening/closing sensing unit configured to sense opening/closing of the door.

The storage compartment may include a first storage compartment and a second storage compartment, in which food is stored, and the camera may be installed to a barrier, the barrier dividing the first storage compartment and the second storage compartment into separate spaces.

In accordance with another aspect of the present invention, a refrigerator includes a main body having a storage compartment in which food is stored, a drawer configured to be introduced into or withdrawn from the storage compartment, the drawer having a receptacle in which food is stored, a camera configured to capture an image of the receptacle, a control unit configured to combine an image captured by the camera in a closed state of the drawer and an image captured by the camera in an open state of the drawer with each other and configured to correct the images into an image showing the receptacle, and a display unit configured to show the corrected image to a user.

The open state of the drawer may include a state in which the drawer is open and is stationary.

The open state of the drawer may include a state in which the drawer is open and is moving.

The camera may be located in a front region of the receptacle.

The camera may be installed to capture an image of the receptacle within a maximum withdrawal region of the receptacle.

The refrigerator may further include a drawer opening/closing sensing unit configured to sense opening/closing of the drawer, and the camera may take a picture based on an elapsed time when the drawer opening/closing sensing unit senses opening of the drawer.

The refrigerator may further include a communication unit configured to transmit the image to an external device.

The refrigerator may further include an image storage unit configured to store the last image corrected by the control unit.

The refrigerator may further include a communication unit configured to transmit the last image stored in the image storage unit to an external device.

In accordance with a further aspect of the present invention, a storage apparatus includes a main body having a storage chamber in which an article is stored, a drawer configured to be moved forward of the main body, a camera located in a front region of the storage chamber to capture an image of the interior of the drawer in a state in which the drawer is withdrawn to the maximum extent, a control unit configured to combine an image captured by the camera in a closed state of the drawer and an image captured by the camera in an open state of the drawer with each other and configured to correct the images into an image showing the interior of the drawer, and a display unit configured to show the corrected image to a user.

The open state of the drawer may include a state in which the drawer is open and is stationary.

The open state of the drawer may include a state in which the drawer is open and is moving.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiment(s) of the invention and together with the description serve to explain the principle of the invention. In the drawings:

FIG. 14 is an explanatory view of operation according to another embodiment of the present invention;

FIG. 18 is an explanatory view showing a picture taking direction of a camera in brief according to a further embodiment;

FIG. 19 is an explanatory view of operation according to a further embodiment;

DETAILED DESCRIPTION OF THE INVENTION

Figure 1:
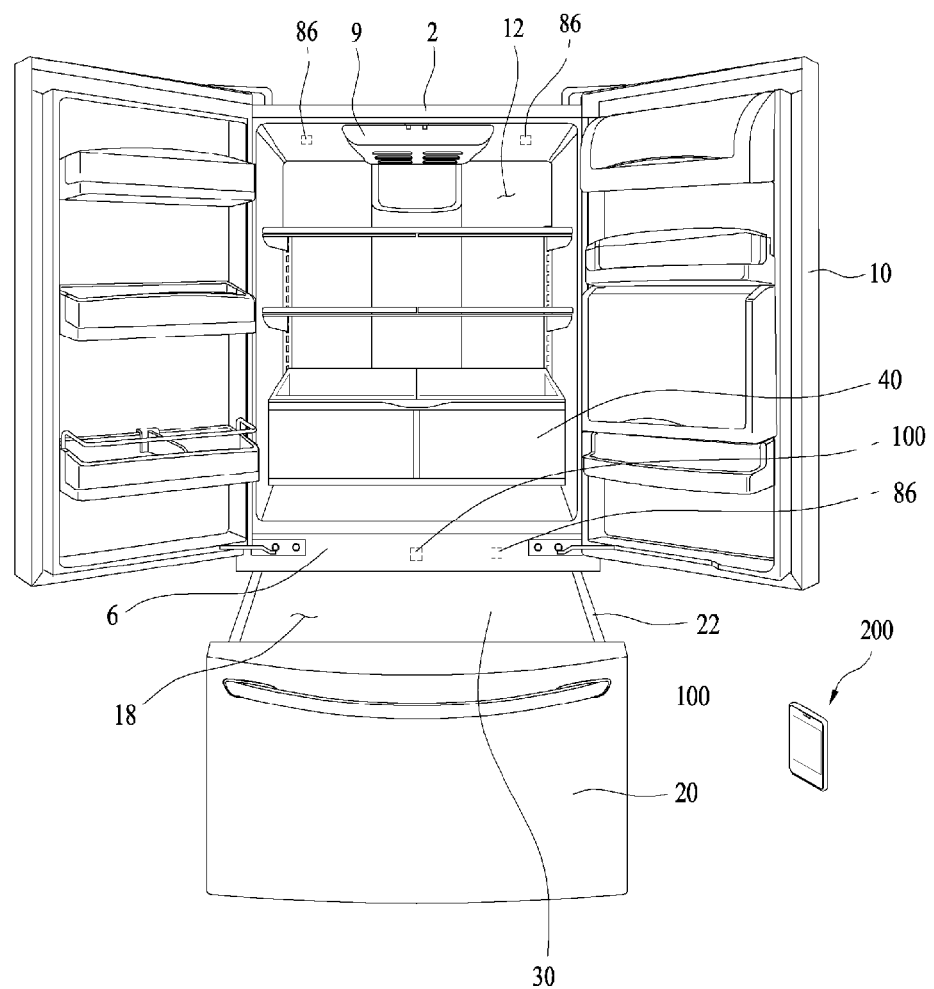
FIG. 1 is a front perspective view of a refrigerator according to one embodiment of the present invention.

Hereinafter, exemplary embodiments of the present invention that may realize the above-described objects concretely will be described with reference to the accompanying drawings.

In the drawings, the shape, size, or the like of components may be exaggerated for clarity and convenience. In addition, the terms particularly defined in consideration of configurations and operations of the present invention may be replaced by other terms based on intensions of those skilled in the art or customs. The meanings of these terms may be construed based on the overall content of this specification.

FIG. 1 is a front perspective view of a refrigerator according to one embodiment of the present invention. A description with reference to FIG. 1 will follow.

The refrigerator according to one embodiment of the present invention includes a main body 2 defining an external appearance of the refrigerator, the main body 2 providing a first storage compartment 12 and a second storage compartment 18 as cold air receiving spaces therein, a first door 10 configured to open the first storage compartment 12, and a second door 20 configured to open the second storage compartment 18.

The first door 10 may open the first storage compartment 12 via pivotal rotation thereof. A plurality of first doors 10 may be provided, such that the first doors 10 may be arranged respectively at both sides of the first storage compartment 12 so as to be pivotally rotated in opposite directions. In this case, the first doors 10 may be connected to the main body 2 via hinges.

The second door 20 may be moved forward of the second storage compartment 18 to open the second storage compartment 18. In this case, rails 22 may be provided at both sides of the second door 20 to guide movement of the second door 20. As such, the second door 20 may slide forward or rearward of the second storage compartment 18.

A cold air duct 9 is provided in the first storage compartment 12 to supply cold air passed through an evaporator into the first storage compartment 12. In detail, a part of cold air passed through the evaporator may be supplied into the first storage compartment 12 through the cold air duct 9.

In addition, a plurality of shelves 14, on which food will be put, may be provided in the first storage compartment 12. A variety of foods may rest on the plurality of shelves 14. The plurality of shelves 14 may be installed at different heights, and some of the plurality of shelves 14 may define an open space therebelow.

A drawer 40 may be provided in the space defined below the shelf 14. In this case, the drawer 40 may allow food to be stored in the lower space defined below the shelf 14 and may be introduced into or withdrawn from the lower space.

Alternatively, a plurality of drawers 40 may be provided to divide the lower space defined by the shelf 14 into a plurality of spaces that may be individually used.

More than one light source 86 to emit light may be installed in the first storage compartment 12 and serve to emit light to the first storage compartment 12 when a user opens the first door 10.

The first storage compartment 12 and the second storage compartment 18 may provide storage spaces having different interior temperatures. In particular, if any one of the first storage compartment 12 or the second storage compartment 18 is a refrigerating compartment, the other one may be a freezing compartment.

The main body 2 may be provided with a barrier 6 to structurally separate the first storage compartment 12 and the second storage compartment 18 from each other. In this case, the barrier 6 may be configured to horizontally extend such that the first storage compartment 12 is defined above the barrier 6 and the second storage compartment 18 is defined below the barrier 6.

In addition, the barrier 6 may have a prescribed thickness to endure a temperature difference between the first storage compartment 12 and the second storage compartment 18.

According to one embodiment of the present invention, a receptacle 30, in which food is stored, is mounted to one side of the second door 20. The receptacle 30 may be moved along with the second door 20 and received in the second storage compartment 18. The receptacle 30 may take the form of a top opened basket, and thus the user may access the receptacle 30 after outwardly withdrawing the second door 20.

A camera 100 to take a picture of the receptacle 30 may be installed in the second storage compartment 18. In this case, the camera 100 may be mounted to the main body 2, i.e. the barrier 6.

The camera 100 may be oriented to take a picture downwardly. The picture taken by the camera 100 may provide an image as if the user looks down the receptacle 30.

More than one light source 86 may be installed in the second storage compartment 18 to emit light to the second storage compartment 18. In this case, the light source 86 may emit light to the receptacle 30 when the user opens the second storage compartment 18, i.e. when the second door 20 is withdrawn.

Alternatively, the light source 86 may emit light to a picture taking range of the camera 100 when the camera 100 takes a picture.

Although not shown in FIG. 1, the first door 10 may be provided with a display unit 120. In this case, the display unit 120 may provide the user with various information including, e.g. food stored in the refrigerator, and transmit information input by the user to other devices.

More specifically, the display unit 120 may have various forms so long as it displays prescribed information and enables touch input of a prescribed instruction. In one example, the display unit 120 may take the form of a touchscreen that realizes simultaneous input and display.

The display unit 120 may be separably coupled to a front surface of the first door 10. Thus, the user may attach or detach the display unit 120 to or from the refrigerator as needed.

In the present invention, prescribed information displayed on the display unit 120 may be transmitted to a terminal 200 that is connected to the refrigerator through a network. The terminal 200 may take the form of a smart-phone that is not integrated with the refrigerator, but independent of the refrigerator to allow the user to carry the terminal 200 to a remote place where the refrigerator is not present.

Accordingly, the user who possesses the terminal 200 may recognize information related to the interior of the refrigerator, more particularly information related to food stored in the receptacle 30 even if the user does not access the refrigerator.

Figure 2:
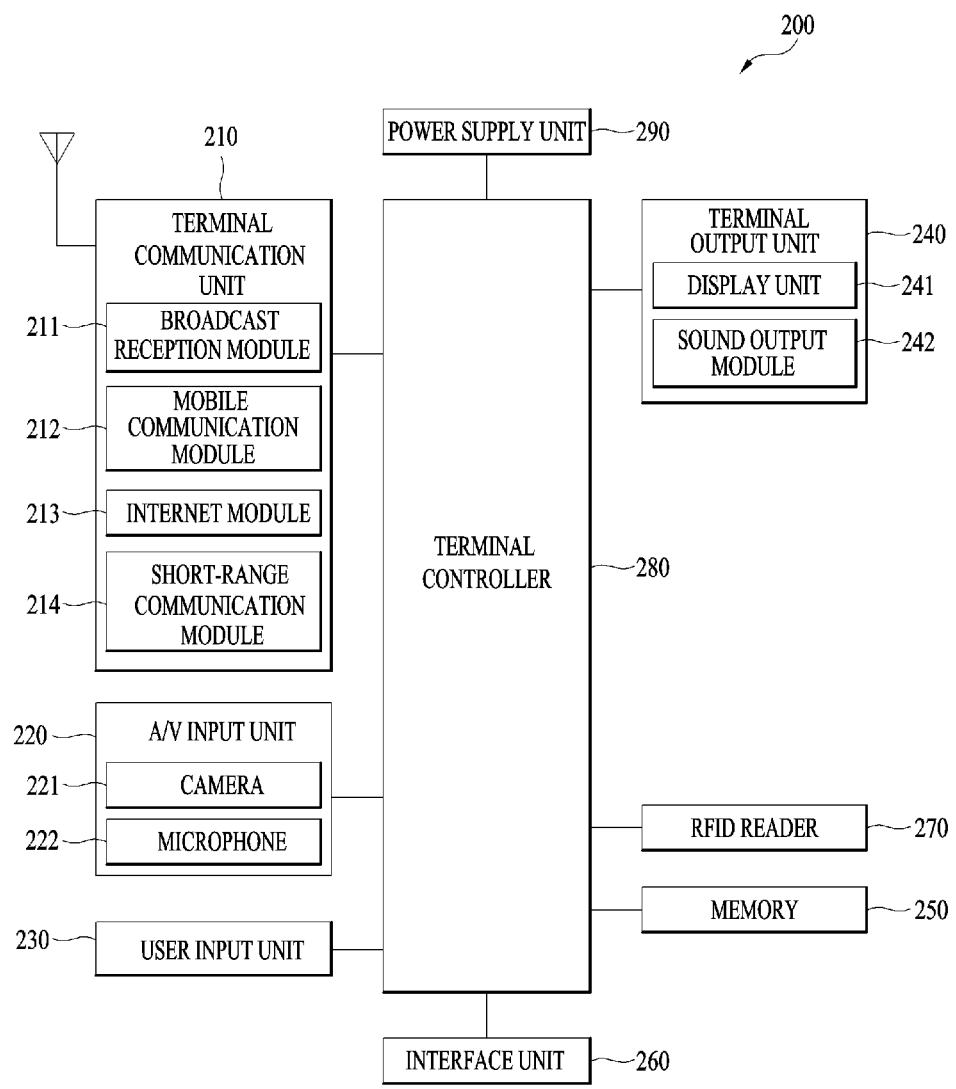
FIG. 2 is a control block diagram of a terminal according to the present invention.

With reference to FIG. 2, the terminal 200 according to the present invention may include a terminal communication unit 210, an Audio/Video (A/V) input unit 220, a user input unit 230, a terminal output unit 240, a memory 250, an interface unit 260, a Radio Frequency Identification (RFID) reader 270, a terminal controller 280, and a power supply unit 290, for example. Note that components shown in FIG. 2 are not essential, and the terminal 200 having a greater or less number of components may be employed.

Hereinafter, the aforementioned components will be described in order.

The terminal communication unit 210 may include one or more modules to enable use of the Internet between the terminal 200 and a wireless communication system or in an Internet protocol network in which the terminal 200 is located.

For example, the terminal communication unit 210 may include a broadcast reception module 211, a mobile communication module 212, an Internet module 213, and a short-range communication module 214.

The broadcast reception module 211 receives broadcast signals and/or broadcast information from an external broadcast management server through a broadcast channel under control of the terminal controller 280, and plays back the same on the display module 241.

The mobile communication module 212 implements transmission/reception of wireless signals with at least one of a base station, an external terminal, and a server through a mobile communication network. The wireless signals may include voice signals, video call signals, or various other data based on transmission/reception of text/multimedia messages.

The Internet module 213 refers to a module for wired/wireless Internet connection. Wireless Internet technologies may include Wireless LAN (WLAN)(Wi-Fi), wireless broadband (WiBro), World Interoperability for Microwave Access (WiMAX), High Speed Downlink Packet Access (HSDPA), and the like.

The short-range communication module 214 refers to a module for short-range communication. Short-range communication technologies may include Bluetooth, Radio Frequency Identification (RFID), Infrared Data Association (IrDA), Ultra Wideband (UWB), ZigBee, and the like.

The A/V input unit 220 serves to input audio signals and video signals, and may include a camera module 221 and a microphone 222, for example.

The camera module 221 processes image information including, e.g. a still image or a moving image captured by an image sensor in a video call mode or an image capture mode. The processed image information may be displayed on a display module 241.

Image data processed in the camera module 221 may be stored in the memory 250, or may be transmitted to, e.g., an external terminal through the terminal communication unit 210. Two or more camera modules 221 may be provided according to use environments.

The microphone 222 receives an external sound signal, e.g., in a call mode, a recording mode or a voice recognition mode, and processes the same into electrical voice data.

The user input unit 230 generates input data to allow the user to control operation of the terminal 200. The user input unit 230 may include a keypad, a direction key, a dome switch, a touchpad (constant-pressure/capacitive), a jog wheel, a jog switch, and the like.

The terminal output unit 240 serves to generate visual or auditory output, and may include the display module 241 and a sound output module 242, for example.

The display module 241 displays (outputs) information processed in the terminal 200.

For example, when displaying information related to the terminal 200 and the refrigerator, the display module 241 of the terminal 200 may display the interior state of the refrigerator.

The display module 241 may include at least one of a Liquid Crystal Display (LCD), a Thin Film Transistor Liquid Crystal Display (TFT LCD), an Organic Light Emitting Diode (OLED), a flexible display, and a 3D display.

If the display module 241 and a sensor to sense a touch motion (hereinafter referred to as 'a touch sensor') are constructed in a layered structure (hereinafter referred to as 'a touchscreen'), the display module 241 may be used as an input device as well as an output device.

The touch sensor may take the form of a touch film, a touch sheet, or a touch pad, for example.

The touch sensor may be configured to convert, e.g., a pressure applied to a specific portion of the display module 241 or a variation of capacitance generated from the specific portion of the display module 241 into an electrical input signal. The touch sensor may be configured to detect a touch pressure applied to the display module 241 as well as a touched location and an area of the touched location.

When a touch input is generated with respect to the touch sensor, the signal(s) corresponding to the touch input is transmitted to a touch controller (not shown). The touch controller processes the signal(s), and transmits data corresponding to the signal(s) to the terminal controller 280. Thereby, the terminal controller 280 may recognize, e.g., whether any region of the display module 241 is touched.

The sound output module 242 outputs data containing audio stored in the memory 250, or outputs sound informing the user of an operational state of the refrigerator. The sound output module 242 may include a receiver, a speaker, or a buzzer, for example.

The memory 250 may store a program for processing and control of the terminal controller 280, and may contain information related to food stored in the refrigerator.

In addition, the memory 250 stores graphic data to provide the user with various messages and information via various visual effects.

The above-described memory 250 may include a storage medium having at least one type among a flash memory type, a hard disk type, a multimedia card micro type, a card type of a memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

The interface unit 260 serves as a path to connect various external devices to the refrigerator terminal 200. The interface unit 260 may receive data or power from an external device, and transfer the data or power to each component in the terminal 200, or transmit internal data of the terminal 200 to an external device.

For example, the interface unit 260 may include a wired/wireless headset port, an external charger port, a wired/wireless data port, a memory card port, a port for connection of a device having an identification module, an audio Input/Output (I/O) port, a video I/O port, and an earphone port.

The terminal controller 280 typically controls an overall operation of the terminal 200.

The power supply unit 290 receives power applied from an external power source through the interface unit 260 and supplies the power to operate each component under control of the terminal controller 280.

Exemplary embodiments described herein may be implemented in a recording medium capable of being read by a computer or a similar device using, e.g., software, hardware, or a combination thereof.

According to hardware implementation, exemplary embodiments described herein may be realized using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions.

In some cases, exemplary embodiments described in the specification may be implemented by the terminal controller 280.

According to software implementation, exemplary embodiments with regard to procedures and functions described in the specification may be realized by separate software modules. Each of the software modules may perform at least one function and operation described in the specification.

Software code may be embodied as a software application that is written in an appropriate programming language. The software code may be stored in the memory 250, and may be executed by the terminal controller 280.

Figure 3:
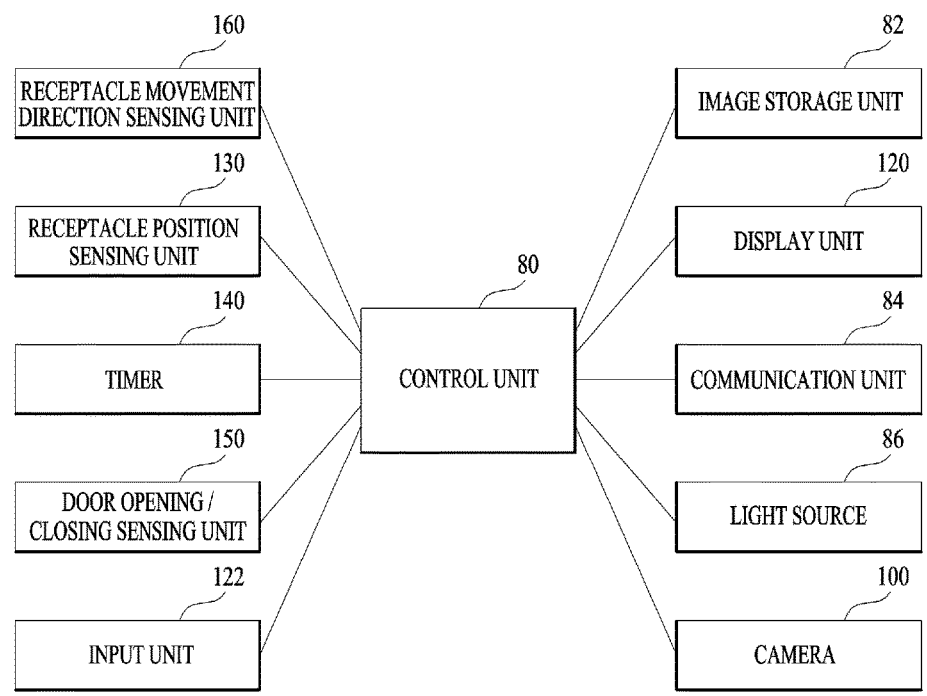
FIG. 3 is a control block diagram according to one embodiment of the present invention.

FIG. 3 is a control block diagram according to one embodiment of the present invention. A description with reference to FIG. 3 will follow.

According to the present invention, a control unit 80 may be provided to combine a plurality of pictures taken by the camera 100 with one another and correct the pictures into an image showing the receptacle 30.

In this case, the control unit 80 may correct a plurality of pictures taken by the camera 100 into a single image. Of course, the control unit 80 may transmit a single picture taken by the camera 100 to an external device, i.e. the terminal 200.

In particular, the control unit 80 may combine an image captured by the camera 100 in a closed state of the door 20 and an image captured by the camera 100 in an open state of the door 20 with each other, and may correct the images into an image showing the receptacle 30.

In this case, the closed state of the door 20 may mean a state in which the receptacle 30 is completely hermetically sealed, or a state in which the receptacle 30 is hermetically sealed to a designated level or more.

The image captured by the camera 100 in the closed state of the door 20 and the image captured by the camera 100 in the open state of the door 20 may show different regions of the receptacle 30. Accordingly, if the receptacle 30 has a long length in a front-and-rear direction, plural images captured by the camera 100 may be combined with one another to acquire an image of the entire receptacle 30.

In this case, the open state of the door 20 may include a state in which the door 20 is open and is stationary. That is, the open state of the door 20 may mean that the door 20, i.e. the receptacle 30 is stationary in a state in which the user is accessible to the receptacle 30. For example, the open state of the door 20 may correspond to a point in time immediately before the door 20 that has been forwardly withdrawn to open the receptacle 30 is pushed rearward to hermetically seal the receptacle 30.

Moreover, the open state of the door 20 may include a state in which the door 20 is open and is moving. That is, the open state of the door 20 may mean that the door 20, i.e. the receptacle 30 is moving in a state in which the user is accessible to the receptacle 30. For example, the open state of the door 20 may correspond to a duration for which the door 20 is being forwardly withdrawn to open the receptacle 30 or a duration for which the door 20 is being pushed rearward to hermetically seal the receptacle 30.

In addition, the open state of the door 20 may include a state in which the door 20 is open and is stationary, and a state in which the door 20 is open and is moving.

The control unit 80 may combine two pictures taken by the camera 100 to correct the pictures into a single image, or may combine three or more pictures to correct the pictures into a single image.

The control unit 80 may provide the user with an intuitively and easily recognizable image by combining the pictures taken by the camera 100. In this case, the control unit 80 may implement combination of a plurality of pictures and individual correction of the pictures. Meanwhile, combination of a plurality of pictures may be implemented by an external control device rather than the control unit 80 of the refrigerator.

According to one embodiment of the present invention, a receptacle position sensing unit 130 may be provided to sense a position of the receptacle 30. The receptacle position sensing unit 130 may check whether the receptacle 30 has been moved as well as a moved position of the receptacle 30.

In addition, when the receptacle position sensing unit 130 senses that the receptacle 30 reaches a predetermined position, the receptacle position sensing unit 130 may transmit a related signal to the control unit 80 to allow the control unit 80 to instruct the camera 100 to take a picture.

In this case, a plurality of positions may be predetermined with regard to the receptacle 30 such that the camera 100 takes a plurality of pictures of the receptacle 30.

The receptacle position sensing unit 130 may include a Hall sensor using Hall effects. The Hall sensor may find the magnitude and direction of a magnetic field using Hall effects in which a potential difference is produced across a conductor carrying an electric current when a magnetic field is applied in a direction perpendicular to that of the current flow.

According to one embodiment of the present invention, a timer 140 may be provided to measure passage of time. In this case, the timer 140 may measure, in particular, a movement duration of the receptacle 30, although the timer 140 may measure general passage of time.

When a predetermined time measured by the timer 140 has passed, the timer 140 may transmit a related signal to the control unit 80 to allow the control unit 80 to instruct the camera 100 to take a picture.

According to one embodiment of the present invention, a door opening/closing sensing unit 150 may be provided to sense opening/closing of the second door 20. The door opening/closing sensing unit 150 may sense whether or not the second door 20 is released from contact with the main body 2, for example.

The door opening/closing sensing unit 150 may transmit information related to whether the door 20 is open or closed to the control unit 80.

According to one embodiment of the present invention, a receptacle movement direction sensing unit 160 may be provided to sense a movement direction of the receptacle 30. In this case, the receptacle movement direction sensing unit 160 may consist of a plurality of receptacle position sensing units 130 to sense a movement direction of the receptacle 30 using sensed results from the receptacle position sensing units 130.

The receptacle movement direction sensing unit 160 may sense a movement direction of the receptacle 30 and transmit a related signal to the control unit 80. That is, the control unit 80 may detect a movement direction of the receptacle 30 under assistance of the receptacle movement direction sensing unit 160.

More specifically, since the receptacle 30 may be withdrawn from the second storage compartment 18 or be introduced into the second storage compartment 18, the receptacle movement direction sensing unit 160 may sense whether the receptacle 30 is moving forward or rearward.

According to one embodiment of the present invention, an image storage unit 82 may be provided to store an image corrected by the control unit 80. The image storage unit 82 may store all images corrected by the control unit 80 including the most recently corrected image as well as previously corrected images.

The image stored in the image storage unit 82 may be transmitted to the terminal 200 or the display unit 120, and the user may recognize information related to the interior of the refrigerator via the terminal 200 or the display unit 120.

According to one embodiment of the present invention, an input unit 122 may be provided to allow the user to input an instruction to the refrigerator. In this case, the input unit 122 may be integrated with the display unit 120 to allow the user to input an instruction via the display unit 120.

The input unit 122 may receive a general instruction with regard to control of the refrigerator, and may also receive an instruction with regard to control of the camera 100.

According to one embodiment of the present invention, a communication unit 84 may be provided to transmit an image corrected by the control unit 80 to an external device. In this case, the communication unit 84 may transmit a corrected image to the terminal communication unit 210 as exemplarily shown in FIG. 2.

In particular, the communication unit 84 may transmit an image stored in the image storage unit 82 or an image corrected by the control unit 80 to an external device.

Meanwhile, the control unit 80 may control the light source 86 to allow the light source 86 to emit light to the receptacle 30 when the camera 100 takes a picture.

Figure 4:
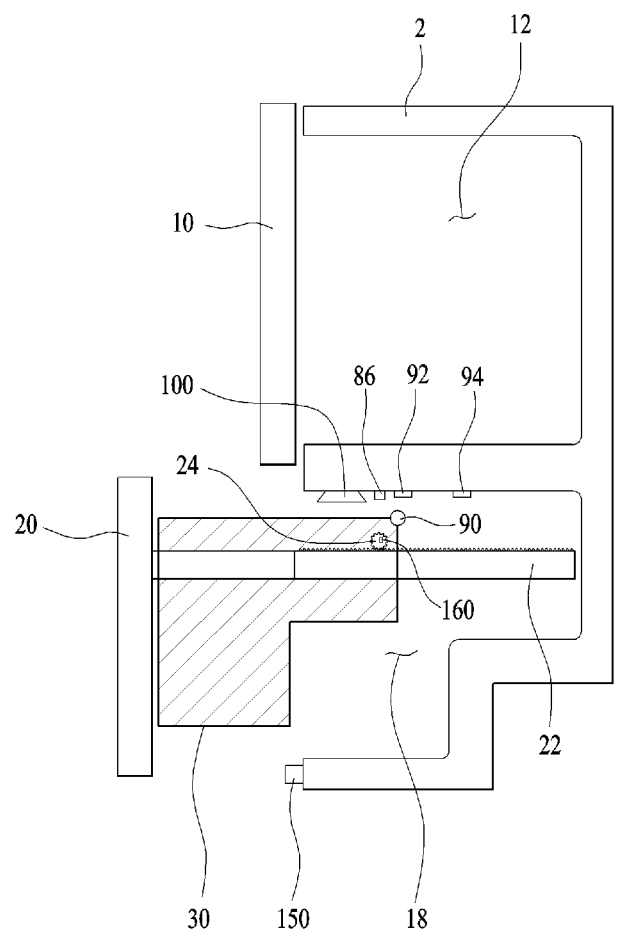
FIGS. 4 to 6 are explanatory views of operation according to one embodiment of the present invention.

FIG. 4 is an explanatory view of operation according to one embodiment of the present invention. First, constituent elements of the present invention will be described in detail with reference to FIG. 4.

The camera 100 may be installed in a front region of the storage compartment. In this case, the front region of the storage compartment may mean a place proximate to a position where the door 20 is located.

In particular, the camera 100 may be installed to take a picture of the receptacle 30 within a maximum withdrawal region of the receptacle 30. That is, even in a section where the receptacle 30 is maximally withdrawn, a picture taken by the camera 100 may show the interior of the receptacle 30. In other words, the camera 100 may be located in a movement path of the receptacle 30 to ensure that an image captured by the camera 100 shows the interior of the receptacle 30.

As the camera 100 is located in the front region of the storage compartment, the camera 100 may capture images of the receptacle 30 at various positions during movement of the receptacle 30. That is, according to the present invention, the camera 100 is stationary, whereas the receptacle 30 is movable, which may allow the camera 100 to take pictures in various ways. In other words, according to the present invention, even if a single camera does not have an angle of view required to take a picture of the interior of the entire receptacle 30, acquisition of the picture of the interior of the entire receptacle 30 may be possible.

The receptacle position sensing unit 130 may be installed to the ceiling of the second storage compartment 18. In this case, the receptacle position sensing unit 130 may include a plurality of Hall sensors 92 and 94 installed to the barrier 6. In addition, the receptacle position sensing unit 130 may include a magnet 90 provided at one side of the receptacle 30. The magnet 90 has an effect on the plurality of Hall sensors 92 and 94 while being moved along with the receptacle 30, thereby assisting the Hall sensors 92 and 94 in determining a position of the receptacle 30. That is, if the magnet 90 has an effect on the respective Hall sensors 92 and 94, it may be understood that the receptacle 30 is moved to a position corresponding to the Hall sensors 92 and 94.

The magnet 90 may be located at one end of the receptacle 30. Of course, the magnet 90 may be installed at various positions of the receptacle 30.

In this case, the plurality of Hall sensors 92 and 94 may be spaced apart from each other, thereby serving to sense a moved position of the receptacle 30. Of course, a greater number of Hall sensors than two Hall sensors 92 and 94 may be provided to enable more precise determination of a position of the receptacle 30.

If the two Hall sensors 92 and 94 are provided, the Hall sensors 92 and 94 may be located at trisection positions to divide the second storage compartment 18 into three parts. In the case of the plurality of Hall sensors, it is desirable that the Hall sensors be equidistantly spaced apart from one another.

The camera 100 and the light source 86 may be installed to the barrier 6. In this case, the camera 100 may be located proximate to a position where the second door 20 and the barrier 6 meet each other. That is, the camera 100 may be located closer to the second door 20 than the main body 2. The camera 100 is kept stationary regardless of movement of the second door 20.

The light source 86 may be positioned to emit light to the receptacle 30. That is, the light source 86 may emit light downward.

The second door 20 and the receptacle 30 may be introduced or withdrawn along the rails 22. In this case, the rails 22 may take the form of lines of plural screw threads, and the receptacle 30 may have a gear 24 that is movable along the screw threads. That is, when the second door 20 and the receptacle 30 are withdrawn from the second storage compartment 18, the gear 24 may be rotated counterclockwise. On the other hand, when the second door 20 and the receptacle 30 are introduced into the second storage compartment 18, the gear 24 may be rotated clockwise.

In this case, the receptacle movement direction sensing unit 160 may be provided at the gear 24. That is, the receptacle movement direction sensing unit 160 may sense a movement direction of the receptacle 30 according to a rotating direction of the gear 24.

More specifically, it may be determined that the user withdraws the receptacle 30 when the gear 24 is rotated counterclockwise, and introduces the receptacle 30 when the gear 24 is rotated clockwise. Of course, the receptacle movement direction sensing unit 160 may have various other shapes so long as it may sense a movement direction of the receptacle 30.

The door opening/closing sensing unit 150 to sense opening/closing of the second door 20 may be mounted to the main body 2. The door opening/closing sensing unit 150 may be mounted to the main body 2 at a position where the second door 20 closes the second storage compartment 18, and thus may be pressurized when the second door 20 comes into contact with the main body 2. On the other hand, the door opening/closing sensing unit 150 may be released when the second door 20 opens the second storage compartment 18, i.e. when the second door 20 is separated from the main body 2. That is, the door opening/closing sensing unit 150 may sense opening or closing of the second storage compartment 18 according to whether or not the door opening/closing sensing unit 150 is pressurized by the second door 20.

Meanwhile, a plurality of cameras 100 may be provided. In this case, the plurality of cameras 100 may be arranged parallel to the second door 20. If the receptacle 30 has a great width, the receptacle 30 may deviate from a picture taking range of the camera 100. Therefore, a plurality of cameras may be installed to eliminate a blind area of the receptacle 30.

Figure 5:
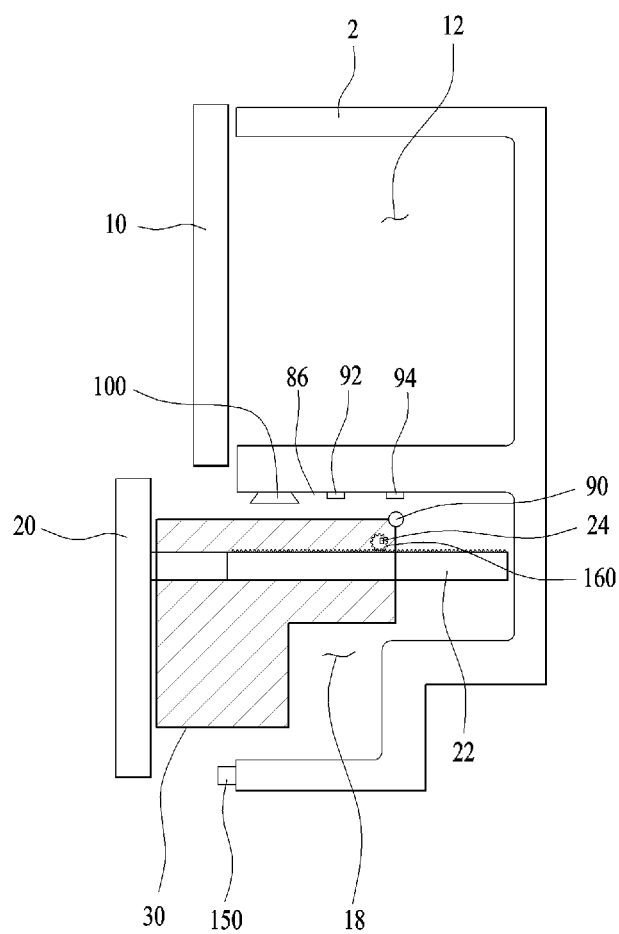
Figure 6:
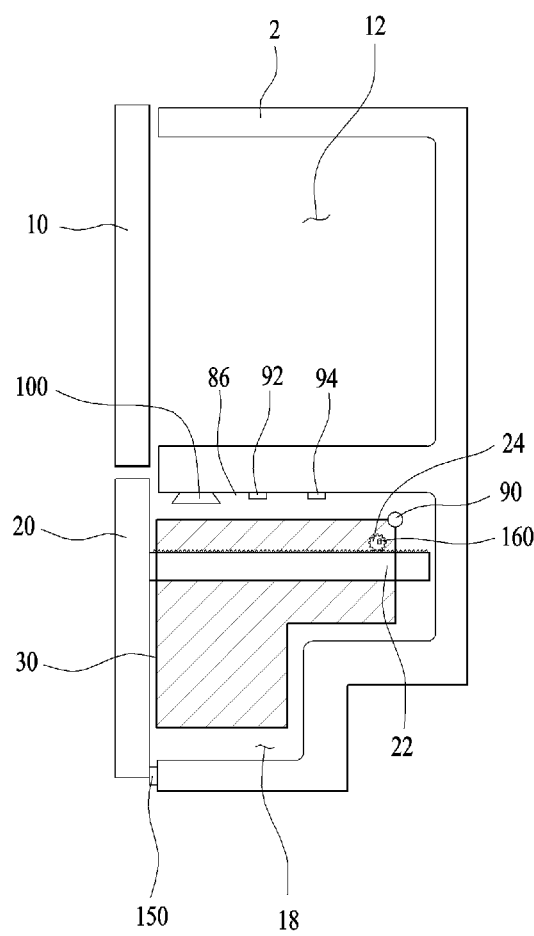

With reference to FIGS. 4 to 6, operation according to one embodiment of the present invention will hereinafter be described.

The door opening/closing sensing unit 150 may sense whether the second door 20 opens or closes the second storage compartment 18. Thus, the door opening/closing sensing unit 150 may sense a moment when the second door 20 that has hermetically sealed the second storage compartment 18 is open. That is, this moment may be recognized as a moment when the door opening/closing sensing unit 150 that has been continuously pressurized by the second door 20 is released.

When the door opening/closing sensing unit 150 senses the opening moment of the second door 20, the camera 100 may take a picture.

Then, as the receptacle 30 is moved, the magnet 90 may have an effect on the Hall sensors 92 and 94, thereby allowing the Hall sensors 92 and 94 to determine a position of the receptacle 30. In this way, the camera 100 may take a picture at a position where the magnet 90 has an effect on the Hall sensors 92 and 94.

That is, the camera 100 may take a total of three pictures until the second door 20 is moved from a closed state to a completely open position. The pictures acquired at this time may provide images as exemplarily shown in FIG. 9.

Meanwhile, the light source 86 may emit light when the camera 100 takes a picture. Of course, the light source 86 may not emit light if sufficient luminance to allow the camera 100 to take a picture is ensured.

Figure 7:
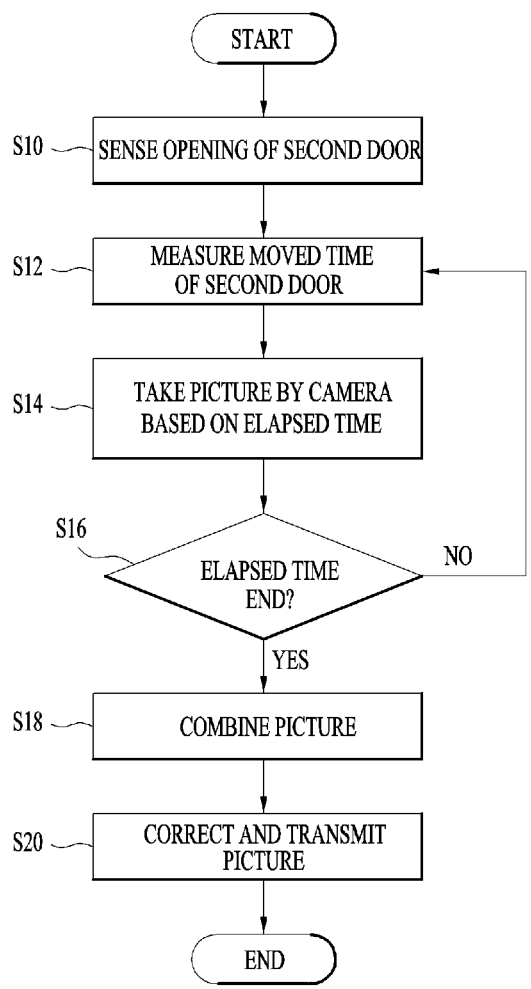
FIG. 7 is a control flowchart showing a picture taking process based on an elapsed time as a second door is open according to one embodiment of the present invention.

FIG. 7 is a control flowchart showing a picture taking process based on an elapsed time as the second door is open according to one embodiment of the present invention. A description with reference to FIG. 7 will follow.

The door opening/closing sensing unit 150 may sense opening of the second door 20 (S10).

The timer 140 may measure an elapsed time starting from a moment when the second door 20 is open (S12).

In this case, the camera 100 may take a picture of the receptacle 30 based on an elapsed time measured by the timer 140 (S14).

The elapsed time may be calculated by an average speed at which a general user moves the second door 20. That is, the camera 100 may take a picture of the receptacle 30 whenever the camera 100 passes the trisection positions as the general user moves the second door 20.

Meanwhile, the elapsed time may mean two trisection points in time taken until the user completely withdraws the second door 20.

Then, it is determined whether or not the elapsed time ends (S16). That the elapsed time ends may mean that the second door 20 is withdrawn to a position where it is unnecessary to take a picture by the camera 100.

As the camera 100 has taken a plurality of pictures, the control unit 80 may combine the plurality of pictures with one another (S18).

Then, the control unit 80 may correct the plurality of pictures into a single image, and transmit the single image to a device except for the camera 100 (S20).

Figure 9:
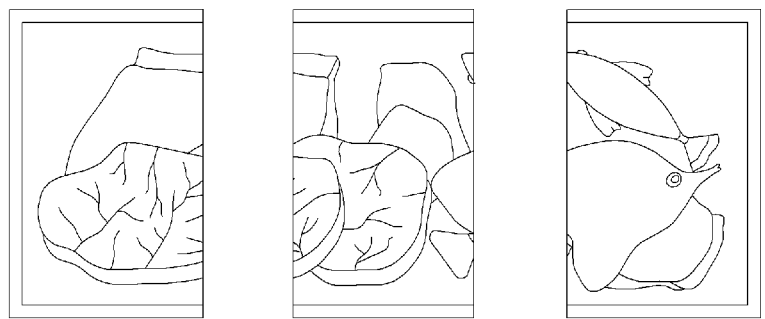
FIG. 9 is a view showing a plurality of pictures.
Figure 10:
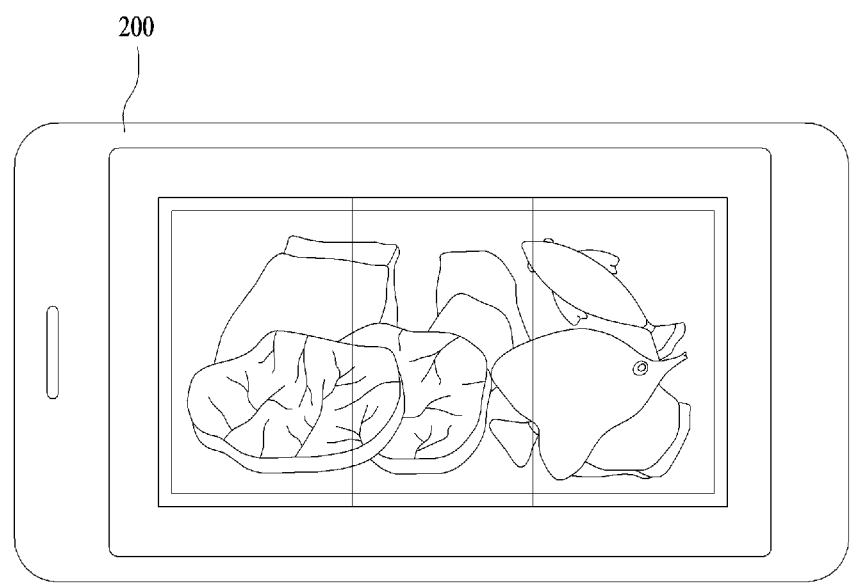
FIG. 10 is a view showing a state in which the pictures of FIG. 9 are corrected and transmitted to a terminal.

Meanwhile, the plurality of pictures taken by the camera 100 may provide images as exemplarily shown in FIG. 9, and finally may be transmitted to the terminal 200 in the form of an image as exemplarily shown in FIG. 10. The user may intuitively and easily recognize information related to food stored in the receptacle 30 by the single image exemplarily shown in FIG. 10.

Figure 8:
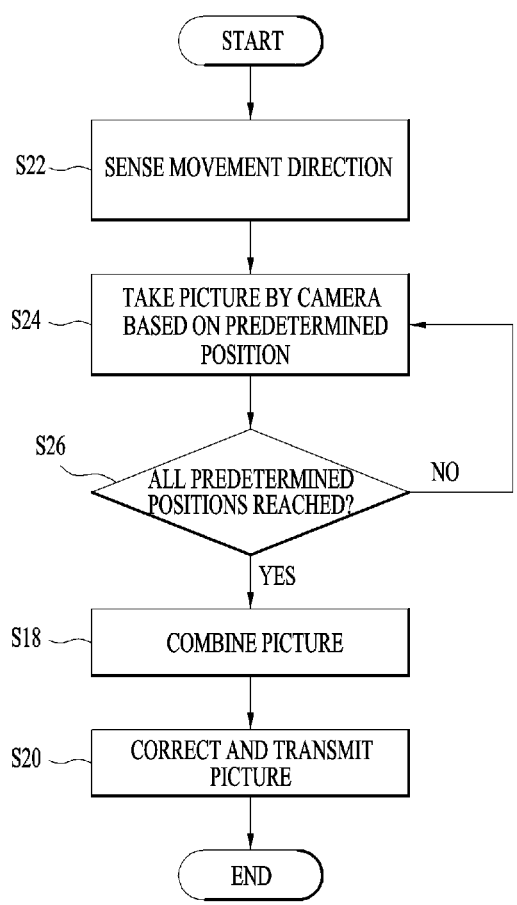
FIG. 8 is a control flowchart showing a picture taking process based on a movement direction of a second door according to one embodiment of the present invention.

FIG. 8 is a control flowchart showing a picture taking process based on a movement direction of the second door according to one embodiment of the present invention. A description with reference to FIG. 8 will follow.

First, the receptacle movement direction sensing unit 160 senses a movement direction of the second door 20 or the receptacle 30 (S22). This is because the receptacle 30 is fixed to the second door 20 and the receptacle 30 and the second door 20 are moved together. That is, the receptacle movement direction sensing unit 160 may sense whether the second door 20 or the receptacle 30 is introduced into or withdrawn from the second storage compartment 18.

When the receptacle movement direction sensing unit 160 senses the above-described introduction or withdrawal, the camera 100 may take a picture of the receptacle 30.

If it is determined by the receptacle position sensing unit 130 that the receptacle 30 reaches a predetermined position, the camera 100 may take a picture at the corresponding position (S24).

If it is determined that the receptacle 30 has reached all predetermined positions (S26), a plurality of pictures has been taken by the camera 100, and therefore the control unit 80 may combine the plurality of pictures with one another (S18).

On the other hand, if it is determined that the receptacle 30 does not reach all of the predetermined positions (S26), the camera 100 may still ready for taking a picture.

Then, the control unit 80 may correct the plurality of pictures into a single picture, and transmit the single picture to a device except for the camera 100 (S20).

Meanwhile, the plurality of pictures taken by the camera 100 may provide images as exemplarily shown in FIG. 9, and finally may be transmitted to the terminal 200 in the form of an image as exemplarily shown in FIG. 10.

In this case, it is desirable that the camera 100 take pictures as the receptacle 30 is moved to be introduced into the second storage compartment 18, and the control unit 80 combines the pictures.

This is because the user may move the second door 20 forward when taking food out of the receptacle 30 or storing new food in the receptacle 30, and thereafter move the second door 20 rearward to close the second storage compartment 18.

That is, the user will introduce the receptacle 30 into the second storage compartment 18 after accessing the receptacle 30 and completing desired work, and the latest information related to the receptacle 30 may be acquired upon occurrence of the above-described situation.

FIG. 9 is a view showing a plurality of pictures. A description with reference to FIG. 9 will follow.

The camera 100 may take a plurality of pictures as exemplarily shown in FIG. 9.

In this case, the taken pictures may provide an image as if the user looks down the receptacle 30. This is because the camera 100 is oriented to take a picture downward.

Meanwhile, the camera 100 may take four or more pictures, or may take two or less pictures, rather than taking three pictures. That is, pictures taken by the camera 100 may be adjusted by adjusting the number of pictures taken by the camera 100 and a picture taking range of the camera 100.

For example, if a picture taking range of the camera 100 at a single picture taking time is increased, it is possible to reduce the number of pictures taken by the camera 100.

On the other hand, if a picture taking range of the camera 100 at a single picture taking time is reduced, it is desirable to increase the number of pictures taken by the camera 100, so as to acquire an image of the entire receptacle 30.

The camera 100 may be fixed to the main body 2, and the second door 20 or the receptacle 30 may be moved. Accordingly, even if the camera 100 is stationary, a picture taking region of the camera 100 varies as the receptacle 30 is withdrawn by different degrees. The camera 100 may take a picture as the withdrawal degree of the receptacle 30 varies.

FIG. 10 is a view showing a state in which the pictures of FIG. 9 are corrected and transmitted to the terminal. A description with reference to FIG. 10 will follow.

Although FIG. 10 shows a picture displayed on the terminal 200, the same information may be transmitted to the display unit 120.

In this case, the image contains content regarding the interior of the receptacle 30. That is, the image may show the entire receptacle 30.

In addition, the image may provide a screen as if the user looks down the interior of the receptacle 30 in a state in which the receptacle 30 is sufficiently exposed to the user, thereby assisting the user in intuitively and easily recognizing the image.

Meanwhile, the image may be a single panoramic picture. That is, the single picture may prevent unnecessary increase in photo capacity when the picture is transmitted to the user.

The user may recognize information related to the state, kind, and number of food stored in the receptacle 30 by simply viewing the image. Accordingly, it is unnecessary to frequently open the door 20 of the refrigerator, and energy consumption may be reduced by preventing leakage of cold air of the second storage compartment 18 due to opening of the door 20.

In addition, when the user is away from home, the user may determine food to be purchased and food not to be purchased using the image. Accordingly, waste of food due to repeated purchase and inconvenience caused when not purchasing necessary food may be prevented.

Figure 11:
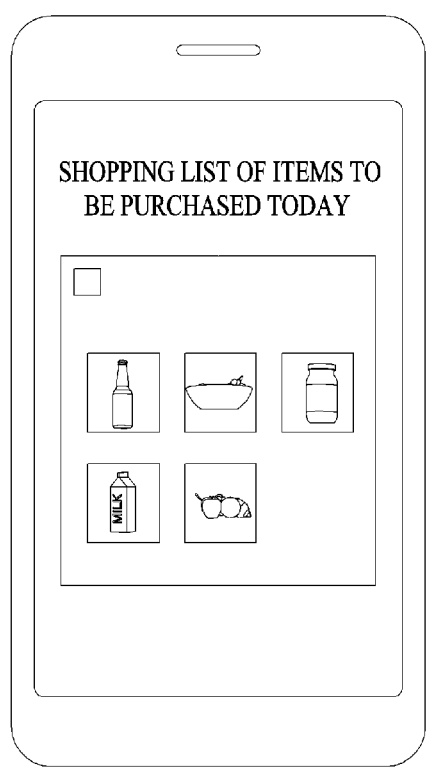
FIG. 11 is a view showing an implementation example that a user is usable in the state of FIG. 10.

FIG. 11 is a view showing an implementation example that a user is usable in the state of FIG. 10. A description with reference to FIG. 11 will follow.

The image as exemplarily shown in FIG. 10 may be processed to provide the user with a shopping list of items that the user needs to purchase.

The shopping list of items may be produced and managed by the user as information related to food is directly extracted from the image, or as the user extracts information related to food and additionally inputs and manages the information.

Figure 12:
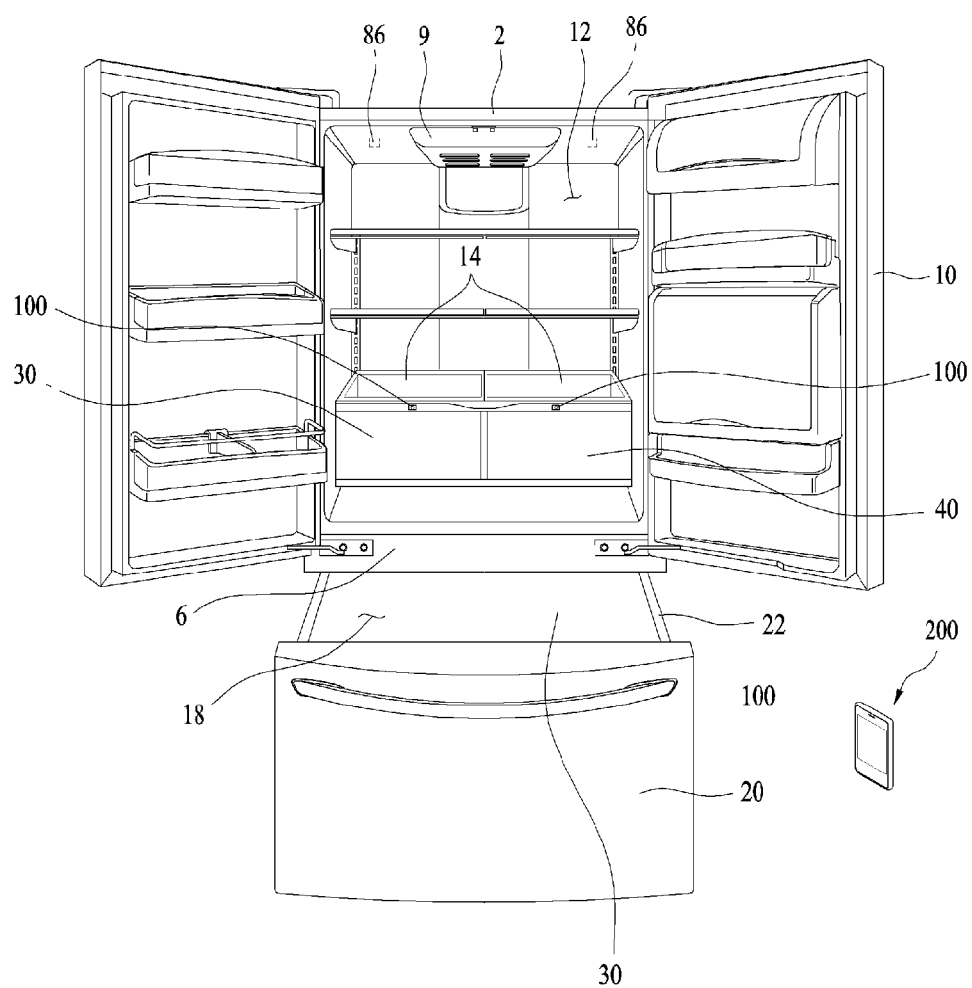
FIG. 12 is a front perspective view of a refrigerator according to another embodiment of the present invention.

FIG. 12 is a front perspective view of a refrigerator according to another embodiment of the present invention. A description with reference to FIG. 12 will follow.

Another embodiment of the present invention may be additionally applied to the refrigerator according to the firstly described embodiment of the present invention. Of course, another embodiment of the present invention may be applied to a side by side type refrigerator in which a refrigerating compartment and a freezing compartment are located at left and right sides, or a general refrigerator in which each of a refrigerating compartment door and a freezing compartment door opens or closes a storage compartment via pivotal rotation thereof.

Accordingly, in the following description of another embodiment of the present invention, the same parts as those of the firstly described embodiment of the present invention will not be described for convenience of description. With regard to these parts a description of which is omitted, the same or similar content may be applied to another embodiment of the present invention.

The drawer 40 provided below the shelf 14 internally defines the receptacle (30, shown in detail in FIG. 14) in which food is stored. In this case, the drawer 40 may be introduced into or withdrawn from the space defined below the shelf 14.

The camera 100 may be installed to the shelf 14 to take a picture of the space below the shelf 14, i.e. the receptacle 30.

When the drawer 40 is sufficiently introduced into the space below the shelf 14, the space below the shelf 14, i.e. the receptacle 30 may be hermetically sealed. The receptacle 30 may serve to store food, such as vegetables, etc.

Two drawers 40 may be arranged in a width direction to divide a width of the main body 2 into two parts. If the two drawers 40 are provided, it is desirable to provide two or more cameras 100. That is, the number of the cameras 100 may be equal to or greater than the number of the drawers 40. As such, each camera 100 may take a picture of the receptacle 30 of the drawer 40 proximate thereto.

If a plurality of drawers 40 is provided, the drawers 40 may be independently introduced or withdrawn. Likewise, if the camera 100 is provided to correspond to the drawer 40 in a one to one ratio, each camera 100 takes a picture of food stored in the receptacle 30 provided in the corresponding drawer 40.

The camera 100 may be centrally located in a width direction of the single drawer 40. That is, a single camera may be provided to take a picture of a single drawer. In addition, the camera 100 may be placed on the shelf 14 so as not to be moved differently from the drawer 40, thereby serving to take a picture downward.

The light source 86 to emit light to the first storage compartment 12 may be mounted in the first storage compartment 12. The light source 86 may emit light to the first storage compartment 12 to allow the user to recognize the interior of the first storage compartment 12 when the first door 10 is open.

A portion of the shelf 14 and a portion of the drawer 40 may be formed of a transparent material. This serves to allow light emitted from the light source 86 to be easily transmitted to the receptacle 13 through the shelf 14 and the drawer 40. With this feature, the camera 100 may acquire sufficient luminance when taking a picture of the receptacle 30.

Figure 13:
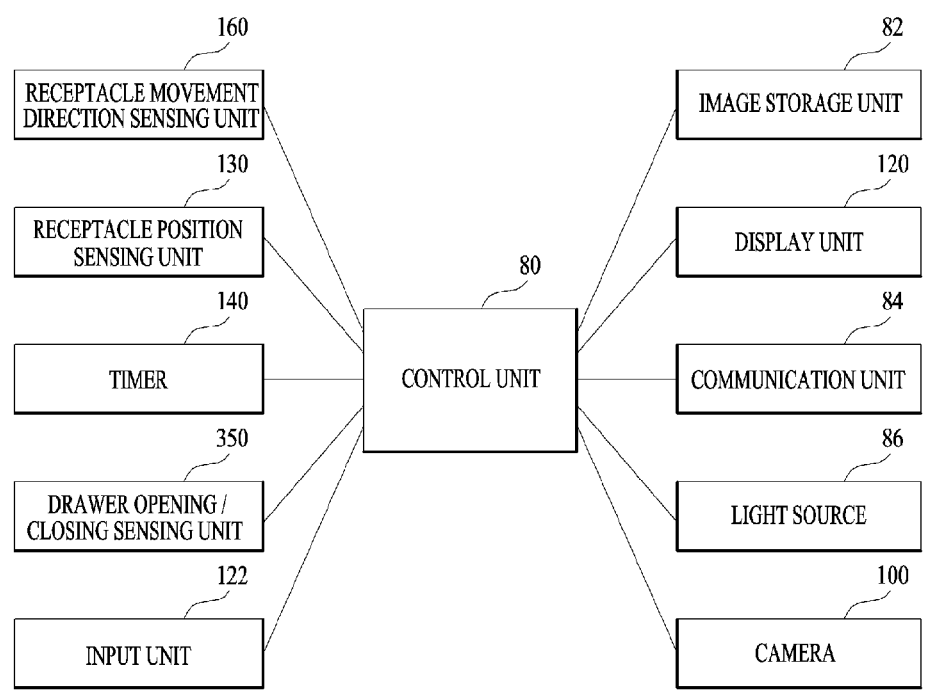
FIG. 13 is a control block diagram according to another embodiment of the present invention.

FIG. 13 is a control block diagram according to another embodiment of the present invention. A description with reference to FIG. 13 will follow.

According to another embodiment of the present invention, the control unit 80 is provided to combine a plurality of pictures taken by the camera 100 with one another and correct the pictures into an image showing the receptacle 30.

In this case, the control unit 80 may correct a plurality of pictures taken by the camera 100 into a single image. Of course, the control unit 80 may transmit a single picture taken by the camera 100 to an external device, i.e. the terminal 200.

In particular, the control unit 80 may combine an image captured by the camera 100 in a closed state of the drawer 40 and an image captured by the camera 100 in an open state of the drawer 40 with each other, and may correct the images into an image showing the receptacle 30.

In this case, the closed state of the drawer 40 may mean a state in which the receptacle 30 is completely hermetically sealed, or a state in which the receptacle 30 is hermetically sealed to a designated level or more.

In this case, the open state of the drawer 40 may include a state in which the drawer 40 is open and is stationary.

Moreover, the open state of the drawer 40 may include a state in which the drawer 40 is open and is moving.

In addition, the open state of the drawer 40 may include a state in which the drawer 40 is open and is stationary, and a state in which the drawer 40 is open and is moving. The definition of the open state of the drawer 40 may be construed in the same definition of the open state of the drawer 20 according to the firstly described embodiment, and thus a description of this will be omitted herein.

The control unit 80 may combine two pictures taken by the camera 100 to correct the pictures into a single image, or may combine three or more pictures to correct the pictures into a single image.

The control unit 80 may provide the user with an intuitively and easily recognizable image by combining the pictures taken by the camera 100. In this case, the control unit 80 may implement combination of a plurality of pictures and individual correction of the pictures. Meanwhile, combination of the plurality of pictures may be implemented by an external control device rather than the control unit 80 of the refrigerator.

According to another embodiment of the present invention, the receptacle position sensing unit 130 may be provided to sense a position of the receptacle 30. The receptacle position sensing unit 130 may check whether the receptacle 30 has been moved as well as a moved position of the receptacle 30.

In addition, when the receptacle position sensing unit 130 senses that the receptacle 30 reaches a predetermined position, the receptacle position sensing unit 130 may transmit a related signal to the control unit 80 to allow the control unit 80 to instruct the camera 100 to take a picture.

In this case, a plurality of positions may be predetermined with regard to the receptacle 30 such that the camera 100 takes a plurality of pictures of the receptacle 30.

The receptacle position sensing unit 130 may include a Hall sensor using Hall effects. The Hall sensor may find the magnitude and direction of a magnetic field using Hall effects in which a potential difference is produced across a conductor carrying an electric current when a magnetic field is applied in a direction perpendicular to that of the current flow.

According to another embodiment of the present invention, the timer 140 may be provided to measure passage of time. In this case, the timer 140 may measure, in particular, a movement duration of the receptacle 30, although the timer 140 may measure general passage of time.

When a predetermined time measured by the timer 140 has passed, the timer 140 may transmit a related signal to the control unit 80 to allow the control unit 80 to instruct the camera 100 to take a picture.

According to another embodiment of the present invention, a drawer opening/closing sensing unit 350 may be provided to sense opening/closing of the drawer 40. The drawer opening/closing sensing unit 350 may sense whether or not the drawer 40 is released from contact with the shelf 14, for example.

The drawer opening/closing sensing unit 350 may transmit information related to whether the drawer 40 is open or closed to the control unit 80. The drawer opening/closing sensing unit 350 may be provided at each drawer 40. This is because a plurality of drawers 40 may implement individual and independent movement.

According to another embodiment of the present invention, the receptacle movement direction sensing unit 160 may be provided to sense a movement direction of the receptacle 30. In this case, the receptacle movement direction sensing unit 160 may consist of a plurality of receptacle position sensing units 130 to sense a movement direction of the receptacle 30 using sensed results from the receptacle position sensing units 130.

The receptacle movement direction sensing unit 160 may sense a movement direction of the receptacle 30 and transmit a related signal to the control unit 80. That is, the control unit 80 may detect a movement direction of the receptacle 30 under assistance of the receptacle movement direction sensing unit 160.

More specifically, since the receptacle 30 may be withdrawn from or introduced into the space below the shelf 14, the receptacle movement direction sensing unit 160 may sense whether the receptacle 30 is moving forward or rearward.

According to another embodiment of the present invention, the image storage unit 82 may be provided to store an image corrected by the control unit 80. The image storage unit 82 may store all images corrected by the control unit 80 including the most recently corrected image as well as previously corrected images.

The image stored in the image storage unit 82 may be transmitted to the terminal 200 or the display unit 120, and the user may recognize information related to the interior of the refrigerator via the terminal 200 or the display unit 120.

According to another embodiment of the present invention, the input unit 122 may be provided to allow the user to input an instruction to the refrigerator. In this case, the input unit 122 may be integrated with the display unit 120 to allow the user to input an instruction via the display unit 120.

According to another embodiment of the present invention, the communication unit 84 may be provided to transmit an image corrected by the control unit 80 to an external device. In this case, the communication unit 84 may transmit a corrected image to the terminal communication unit 210 as exemplarily shown in FIG. 2.

In particular, the communication unit 84 may transmit an image stored in the image storage unit 82 or an image corrected by the control unit 80 to an external device.

Meanwhile, the control unit 80 may control the light source 86 to allow the light source 86 to emit light to the receptacle 30 when the camera 100 takes a picture.

Figure 15:
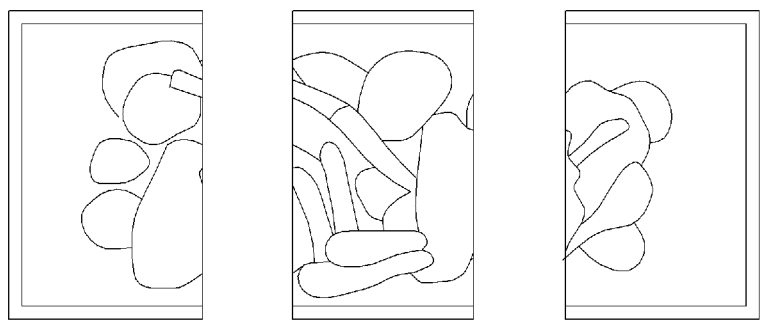
FIG. 15 is a view showing a plurality of pictures.

FIG. 14 is an explanatory view of operation according to another embodiment of the present invention, and FIG. 15 is a view showing a plurality of pictures. A description with reference to FIGS. 14 and 15 will follow.

The camera 100 may be installed in a front region of the receptacle 30. In this case, the front region of the receptacle 30 may mean a portion that the user will grip to open the drawer 40.

In particular, the camera 100 may be installed to take a picture of the receptacle 30 within a maximum withdrawal region of the receptacle 30. That is, even in a section where the receptacle 30 is maximally withdrawn, a picture taken by the camera 100 may show the interior of the receptacle 30.

The above-described method of taking a picture by the camera 100 may be equally applied to another embodiment of the present invention.

That is, the camera 100 may take a picture according to sensed results, i.e. a sensed point in time or a sensed position from the receptacle movement direction sensing unit 160, the receptacle position sensing unit 130, and the timer 140. Thus, a detailed description of the same part as that of the method of taking a picture by the camera 100 according to the firstly described embodiment of the present invention will be omitted herein.

In particular, the receptacle position sensing unit 130 and the receptacle movement direction sensing unit 160 according to another embodiment of the present invention may be installed and configured in the same manner as those of the firstly described embodiment of the present invention. Since detailed configurations of receptacle position sensing unit 130 and the receptacle movement direction sensing unit 160 may be sufficiently understood from FIG. 4, the receptacle position sensing unit 130 and the receptacle movement direction sensing unit 160 are not illustrated in detail in FIG. 14.

The drawer opening/closing sensing unit 350 may be installed at a position where the drawer 40 and the shelf 14 meet each other. That is, the drawer opening/closing sensing unit 350 may be installed to the shelf 14 such that the receptacle 30 is recognized as being hermetically sealed when the drawer 40 applies pressure to the drawer opening/closing sensing unit 350. On the other hand, if the drawer 40 applies no pressure to the drawer opening/closing sensing unit 350, it may be recognized that the drawer 40 is withdrawn and the receptacle 30 is not hermetically sealed.

Of course, the drawer opening/closing sensing unit 350 may be modified into various other shapes so long as it may sense opening/closing of the drawer 40.

According to another embodiment of the present invention, the camera 100 may take a picture while the drawer 40 is being moved in a closing direction thereof as exemplarily shown in FIGS. 14(*a*), 14(*b*), and 14(*c*).

The user may access the receptacle 30 to take stored food out of the receptacle 30 or to introduce new food into the receptacle 30 after opening the drawer 40. Then, after completion of access to the receptacle 30, the user may introduce the drawer 40 into the space below the shelf 14.

That is, the latest information related to the receptacle 30 may be acquired from a picture taken while the drawer 40 is being introduced by the user.

Pictures taken at positions as exemplarily shown in FIGS. 14(*a*), 14(*b*) and 14(*c*) may be a plurality of split pictures as exemplarily shown in FIG. 15.

In this case, the control unit 80 may combine a plurality of pictures to correct the pictures into a single picture. The picture corrected by the control unit 80 may be a panoramic picture.

The camera 100 may be fixed to a surface of the shelf 14 that faces the receptacle 30, and the receptacle 30 may be moved. As such, the camera 100 may take pictures at various positions of the receptacle 30, i.e. as the withdrawal degree of the receptacle 30 varies.

Utilization with regard to another embodiment of the present invention is equal to the firstly described embodiment of the present invention, and thus a detailed description of this will be replaced by the description of the firstly described embodiment.

Figure 16:
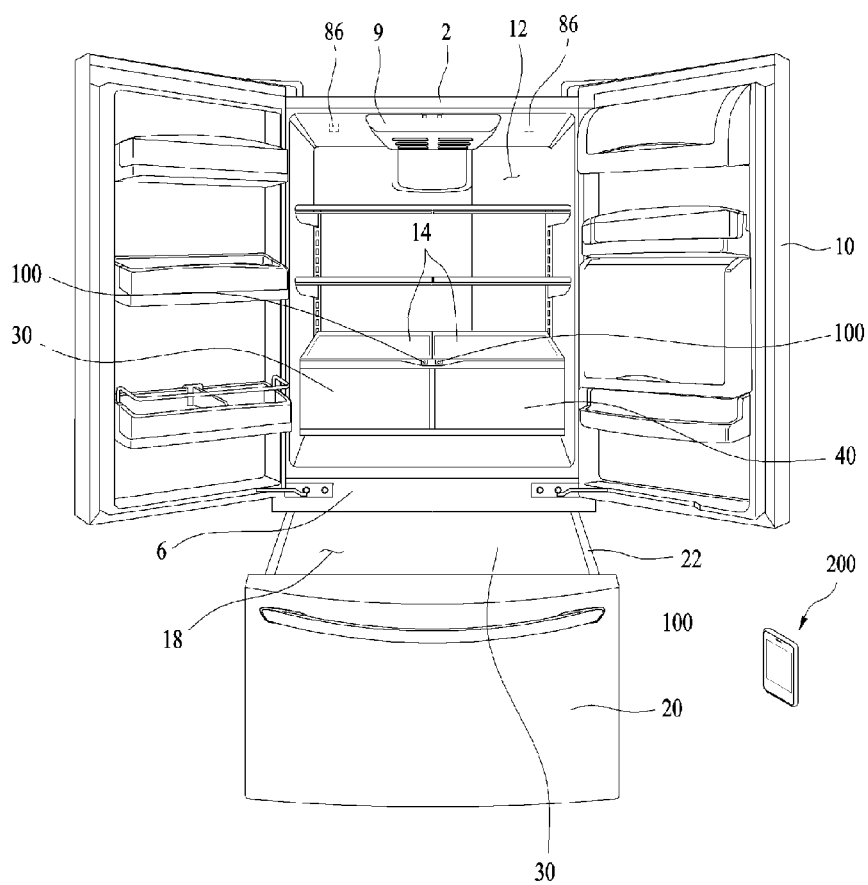
FIG. 16 is a front perspective view of a refrigerator according to a further embodiment of the present invention.

FIG. 16 is a front perspective view of a refrigerator according to a further embodiment of the present invention. A description with reference to FIG. 16 will follow.

As compared to the secondly described embodiment of the present invention, a further embodiment of the present invention has a difference in terms of an installation position of the camera 100. In addition, differently from the secondly described embodiment of the present invention, a further embodiment of the present invention has a difference in that the camera 100 takes a picture of the receptacle 30 in a stationary state of the drawer 40. Accordingly, the following description will focus on differences of related parts, and a detailed description of the same parts will be omitted.

The camera 100 is installed at a position deviated to one side in a width direction of the drawer 40. That is, the camera 100 is located toward one side of the drawer 40 to take a picture within a range from one side to the other side of the drawer 40.

The light source 86 may be installed to the exterior of the receptacle 30 rather than being installed within the receptacle 30. For example, the light source 86 may implement the same function as that of Light Emitting Diodes (LEDs) that emit light to the interior of the first storage compartment 12 in a general refrigerator.

The shelf 14 and the drawer 40 may be formed of a transparent material. In particular, the shelf 14 disposed above the drawer 40 may be formed of a transparent material to allow light emitted from the light source 86 to penetrate the shelf 14 and provide the interior of the receptacle 30 with sufficient luminance.

Figure 17:
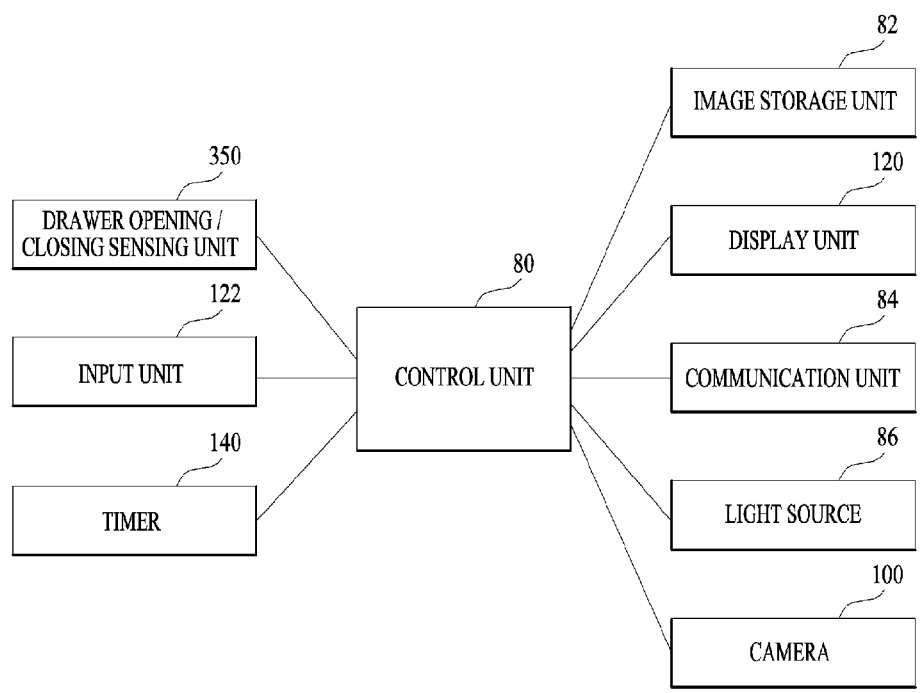
FIG. 17 is a control block diagram according to a further embodiment of the present invention.

FIG. 17 is a control block diagram according to a further embodiment of the present invention. A description with reference to FIG. 17 will follow.

According to a further embodiment of the present invention, differently from the secondly described embodiment of the present invention, the receptacle movement direction sensing unit, the receptacle position sensing unit, and the timer are not provided. That is, according to a further embodiment of the present invention, the camera 100 may take a picture in response to a sensed signal from the drawer opening/closing sensing unit 350 and a signal generated from the input unit 122.

The camera 100 may acquire information related to the receptacle 30 by taking a single picture.

Accordingly, the control unit 80 may not need to combine and correct a plurality of pictures taken by the camera 100. That is, the control unit 80 may transmit a picture taken by the camera 100 to the image storage unit 30, or may transmit the picture to an external device via the communication unit 84.

The timer 140 may measure an elapsed time from a point in time when the camera 100 takes a picture. That is, the timer 140 may transmit information, related to an elapsed time from a point in time when the camera takes the last picture, to the control unit 80 or the camera 100.

The camera 100 may take a picture in response to a signal generated from the input unit 122. According to a further embodiment of the present invention, the camera 100 takes a picture in a stationary state of the drawer 40, and therefore the camera 100 may take a picture of the receptacle 30 by operating the input unit 122.

In addition, according to a further embodiment of the present invention, the camera 100 may take a picture in response to a periodic signal generated by the timer 140.

Other constituent elements exemplarily shown in FIG. 17 are equal to those of the secondly described embodiment of the present invention, and thus a detailed description thereof will be omitted.

FIG. 18 is an explanatory view showing a picture taking direction of the camera in brief according to a further embodiment. A description with reference to FIG. 18 will follow.

The camera 100 may provide the user with information related to the interior of the receptacle 30 via single picture taking. Thus, the camera 100 may acquire information related to food stored in the receptacle 30 via single picture taking.

More specifically, the camera 100 may be obliquely oriented at a prescribed angle $\theta_1$ on the basis of a horizontal plane. In this case, the camera 100 may be oriented to face an opposite corner on the basis of a horizontal plane. Of course, instead of the angle $\theta_1$, the camera 100 may be tilted, on the basis of a horizontal plane, by an angle to ensure that the camera 100 effectively takes a picture of food stored in the receptacle 30. Note that the angle $\theta_1$ may be zero degrees or more.

In addition, the camera 100 may be obliquely oriented at a prescribed angle $\theta_2$ on the basis of a vertical plane. In this case, the camera 100 may be oriented to face an opposite corner on the basis of a vertical plane. Of course, instead of the angle $\theta_2$, the camera 100 may be tilted, on the basis of a vertical plane, by an angle to ensure that the camera 100 effectively takes a picture of food stored in the receptacle 30. Note that the angle $\theta_2$ may be zero degrees or more.

According to a further embodiment of the present invention, in consideration of the fact that the camera 100 takes a single still picture of the interior of the receptacle 30, tilting the camera 100 may ensure acquisition of a greater quantity of information. This is because it is difficult to acquire information related to food stored in the receptacle 30 via single picture taking if the camera 100 is oriented parallel to any one corner of the receptacle 30 rather than being tilted.

FIG. 19 is an explanatory view of operation according to a further embodiment. A description with reference to FIG. 19 will follow.

According to a further embodiment of the present invention, as exemplarily shown in FIGS. 19(*a*) and 19(*b*), the camera 100 takes a picture at a moment when the drawer 40 closes the receptacle 30.

That is, after the user withdraws the drawer 40 and then completes access to the receptacle 30, the camera 100 takes a picture of the receptacle 30 when the drawer 40 is again introduced by the user.

In this case, the light source 86 may emit light to the receptacle 30. Of course, since the first door 10 is open while the drawer 40 is being introduced by the user, the light source 86 may continuously emit light without additional manipulation.

The drawer opening/closing sensing unit 350 may be installed to the shelf 14 and serve to sense opening/closing of the drawer 40 according to whether or not the drawer opening/closing sensing unit 350 comes into contact with the drawer 40. As such, a moment when the drawer 40 begins to apply pressure to the drawer opening/closing sensing unit 350 may be recognized as a moment when the drawer 40 is introduced into the space below the shelf 14 to thereby hermetically seal the receptacle 30.

Accordingly, the camera 100 may take a picture of the receptacle 30 at the moment sensed by the drawer opening/closing sensing unit 350.

That is, the camera 100 may take a picture of the receptacle 30 in a state in which the drawer 40 is introduced into the space below the shelf 14, i.e. in a state in which the space below the shelf 14 is hermetically sealed.

The picture taken by the camera 100 may be transmitted to the terminal 200 through the communication unit 84.

Figure 20:
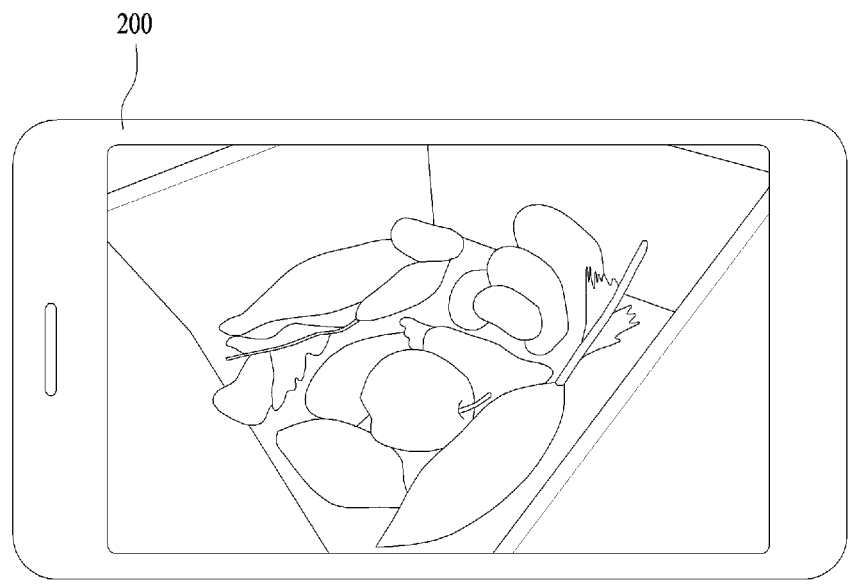
FIG. 20 is a view showing a state in which a picture is transmitted to a terminal according to a further embodiment.

In this case, the picture taken by the camera 100 may provide an image as exemplarily shown in FIG. 20. That is, the picture taken by the camera 100 provides an image as if the user obliquely looks down from the upper side of the receptacle 30.

Figure 21:
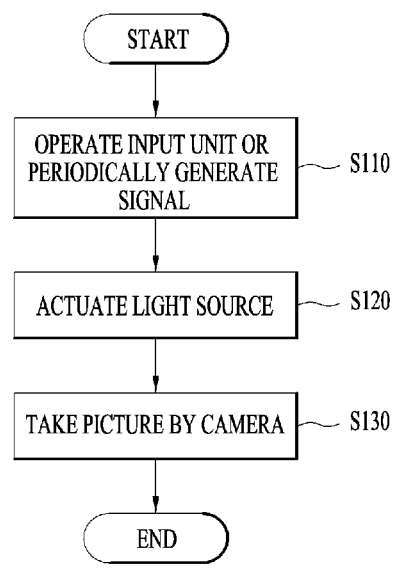
FIG. 21 is a control flowchart showing a picture taking process based on operation of a drawer according to a further embodiment.

FIG. 21 is a control flowchart showing a picture taking process based on operation of the drawer according to a further embodiment. A description with reference to FIG. 21 will follow.

The user may operate the input unit 22 or set the timer 140 to generate a signal at a prescribed interval (S110). In this case, the user may acquire information related to food stored in the refrigerator as the user operates the input unit 122 or based on signals periodically generated by the timer 140.

When the user operates the input unit 122 or the timer 140 generates signals, the first storage compartment 12 is hermetically sealed by the first door 10. That is, even if the user does not open the first storage compartment 12, the input unit 122 or the timer 140 enables picture taking by the camera 100.

The light source 86 typically does not emit light in a closed state of the first storage compartment 12. Thus, it will be understood that sufficient light to allow the camera 100 to take a picture is not emitted to the receptacle 30 and a picture taken by the camera 100 does not contain sufficient information related to the receptacle 30.

Accordingly, the light source 86 is actuated (S120). Since the shelf 14 and the drawer 40 are partially formed of a transparent material, light emitted from the light source 86 may penetrate the shelf 14 and the drawer 40 to thereby reach the receptacle 30.

In this case, the camera 100 is in a stationary state, and thus may take a picture only one time (S130). This is because only the same picture may be acquired even if the single stationary camera takes plural pictures.

Later, the control unit 80 may transmit the picture taken by the camera 100 to the image storage unit 30, or may transmit the picture to an external device via the communication unit 84.

In addition, the present invention may provide a storage apparatus including: a main body having a storage chamber in which an article is stored; a drawer configured to be moved forward of the main body; a camera located in a front region of the storage chamber to take a picture of the interior of the drawer in a state in which the drawer is withdrawn to the maximum extent; a control unit configured to combine an image captured by the camera in a closed state of the drawer and an image captured by the camera in an open state of the drawer with each other and configured to correct the images into an image showing the interior of the drawer; and a display unit configured to show the corrected image to a user.

In particular, in the above-described storage apparatus, the open state of the drawer may include a state in which the drawer is open and is stationary.

Alternatively, in the above-described storage apparatus, the open state of the drawer may include a state in which the drawer is open and is moving.

In this case, the storage apparatus may include the refrigerator as described above, and may refer to an apparatus that may provide a space for storage of industrial products and various other articles rather than food.

As is apparent from the above description, according to the present invention, a user may recognize information related to food stored in a refrigerator even if the user does not open a refrigerator door.

Further, according to the present invention, even when the user is away from home, the user may recognize information related to food stored in the refrigerator via a portable terminal.

Furthermore, according to the present invention, the user may view a screen similar to that when the user directly opens the refrigerator, which assists the user in easily recognizing the interior state of the refrigerator.

It will be apparent that, although the preferred embodiments have been shown and described above, the invention is not limited to the above-described specific embodiments, and various modifications and variations can be made by those skilled in the art without departing from the gist of the appended claims. Thus, it is intended that the modifications and variations should not be understood independently of the technical sprit or prospect of the invention.

What is claimed is:

1. A refrigerator, comprising:
   a main body having a storage compartment, the storage compartment defining an interior space to store objects;
   a shelf provided in the storage compartment;
   a drawer provided below the shelf, the drawer having a receptacle configured to receive items for storage;
   a camera installed at the shelf, the camera being configured to capture images of an interior of the receptacle; and
   a drawer opening/closing sensor configured to detect whether the drawer is released from contact with the shelf,
   wherein the camera captures an image when the drawer opening/closing sensor detects that the drawer contacts the shelf.

2. The refrigerator according to claim 1, wherein camera is located toward one side of the drawer to take an image within a range from the one side to another side of the drawer.

3. The refrigerator according to claim 1, wherein the camera is oriented to face an opposite corner on the basis of a horizontal plane.

4. The refrigerator according to claim 1, wherein the camera is oriented to face an opposite corner on the basis of a vertical plane.

5. The refrigerator according to claim 1, wherein the camera is installed at a front end of the shelf.

6. The refrigerator according to claim 1, wherein the camera is provided at an edge of the shelf in a width direction.

7. The refrigerator according to claim 1, wherein the drawer includes a first drawer and a second drawer provided to be parallel with each other below the shelf, the camera includes a first camera to capture an image of the first drawer and a second camera to capture an image of the second drawer, and the first camera is provided to be adjacent to the second camera.

8. The refrigerator according to claim 1, further comprising:

a light source provided in the storage compartment; and a controller configured to activate the light source when the camera captures an image.

9. The refrigerator according to claim 8, wherein the light source is provide at a ceiling of the interior space to emit light into the storage compartment.

10. The refrigerator according to claim 8, wherein the light source emits light downward.

11. The refrigerator according to claim 1, further comprising a door opening/closing sensor configured to detect whether the door opens or closes.

12. The refrigerator according to claim 11, wherein the controller configured to actuate the light source when the door opening/closing sensor detects that the door opens the storage compartment.

13. The refrigerator according to claim 11, wherein the controller configured to actuate the light source when the camera takes images of the drawer while the door opening/closing sensor detects that the door closes the storage compartment.

14. The refrigerator according to claim 1, further comprising a display configured to externally display at least one of the images.

15. The refrigerator according to claim 1, wherein the captured image provides a view of the interior of the receptacle looking down into the receptacle from above the receptacle.

16. The refrigerator according to claim 1, further comprising a storage device configured to store one or more images captured by the camera.

17. The refrigerator according to claim 16, further comprising a communication device configured to transmit the images stored in the storage device to an external device.

18. The refrigerator according to claim 17, wherein the camera captures an image when the controller receives a user request via the communication device.

* * * * *